(12) United States Patent
Fullerton et al.

(10) Patent No.: US 7,572,527 B2
(45) Date of Patent: Aug. 11, 2009

(54) PERPENDICULAR MAGNETIC RECORDING MEDIUM WITH IMPROVED ANTIFERROMAGNETICALLY-COUPLED RECORDING LAYER

(75) Inventors: Eric E. Fullerton, Morgan Hill, CA (US); Byron Hassberg Lengsfield, III, Gilroy, CA (US); David Margulies, Salinas, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 638 days.

(21) Appl. No.: 11/135,703

(22) Filed: May 24, 2005

(65) Prior Publication Data

US 2006/0269792 A1    Nov. 30, 2006

(51) Int. Cl.
G11B 5/66 (2006.01)
(52) U.S. Cl. .................. 428/829; 428/827; 428/828; 428/828.1; 428/830
(58) Field of Classification Search .............. 428/828.1, 428/828
See application file for complete search history.

(56) References Cited

U.S. PATENT DOCUMENTS

| | | | |
|---|---|---|---|
| 6,495,252 B1 | 12/2002 | Richter et al. | |
| 6,645,614 B1* | 11/2003 | Girt et al. | 428/336 |
| 6,686,070 B1 | 2/2004 | Futamoto et al. | |
| 6,815,082 B2* | 11/2004 | Girt | 428/828.1 |
| 6,830,824 B2* | 12/2004 | Kikitsu et al. | 428/828.1 |
| 6,835,475 B2 | 12/2004 | Carey et al. | |
| 6,846,581 B2* | 1/2005 | Oikawa et al. | 428/828 |
| 7,141,316 B2* | 11/2006 | Iwasaki et al. | 428/828 |
| 2006/0269792 A1* | 11/2006 | Fullerton et al. | 428/828 |

FOREIGN PATENT DOCUMENTS

| | | |
|---|---|---|
| JP | 2002298326 | 10/2002 |
| JP | 2003228809 | 8/2003 |

OTHER PUBLICATIONS

Girt et al., "Antiferromagnetically Coupled Perpendicular Recording Media", IEEE Trans. on Magnetics, vol. 39, No. 5, Sep. 2003, pp. 2306-2310.
Matsunumu et al. "Very High-Density . . . Recording Media Including New Layer-Structure 'U-Mag'", IEEE Trans. on Magnetics, vol. 41, No. 2, Feb. 2005, pp. 572-576.

* cited by examiner

Primary Examiner—Kevin M. Bernatz
Assistant Examiner—Gary D. Harris
(74) Attorney, Agent, or Firm—Thomas R. Berthold

(57) ABSTRACT

A perpendicular magnetic recording disk has an antiferromagnetically-coupled (AFC) recording layer (RL) comprised of lower and upper ferromagnetic layers, each having a hexagonal-close-packed (hcp) crystalline structure and perpendicular magnetic anisotropy, separated by an antiferromagnetically (AF) coupling layer, wherein the lower ferromagnetic layer (LFM) has substantially higher magnetic permeability than the upper ferromagnetic layer (UFM). The AFC RL is located on an actual exchange break layer (EBL) that separates the AFC RL from the disk's soft magnetic underlayer (SUL). The LFM functions as part of an "effective" exchange break layer (EBL) that also includes the actual EBL and the AF-coupling layer, thereby allowing the actual EBL to be made as thin as possible. The hcp LFM promotes the growth of the hcp UFM in the same way the actual EBL does so that its thickness contributes to the thickness necessary to grow the hcp UFM. The effective EBL appears to be magnetically "thin" during the write process and magnetically "thick" during the readback process.

19 Claims, 3 Drawing Sheets

PERPENDICULAR MAGNETIC RECORDING MEDIUM WITH IMPROVED ANTIFERROMAGNETICALLY-COUPLED RECORDING LAYER

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The most common type of perpendicular magnetic recording system is one that uses a "probe" or single pole recording head with a "dual-layer" media as the recording disk, as shown in FIG. 1. The dual-layer media comprises a perpendicular magnetic data recording layer (RL) formed on a "soft" or relatively low-coercivity magnetically permeable underlayer (SUL), with the SUL serving as a flux return path for the field from the pole recording head. This type of system is also called "Type 1" perpendicular magnetic recording. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field H acting on the recording layer RL. The disk also includes the hard disk substrate, a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the EBL and by virtue of its high permeability produces a magnetic mirror image of the RWH during the write process. This effectively brings the RL into the gap of the ARH and allows for a large write field H inside the RL.

One type of material for the RL is a conventional polycrystalline granular cobalt alloy, such as a CoPtCr alloy. This conventional material has out-of-plane of perpendicular magnetic anisotropy as a result of the c-axis of its hexagonal-close-packed (hcp) crystalline structure being induced to grow perpendicular to the plane of the layer during deposition. To induce this growth, the EBL onto which the RL is formed is also typically a material with an hcp crystalline structure. Thus ruthenium (Ru) is one type of material proposed for the EBL.

A perpendicular magnetic recording medium has been proposed wherein the RL is an antiferromagnetically-coupled (AFC) layer of two identical ferromagnetic layers, each having perpendicular magnetic anisotropy, separated by an antiferromagnetically (AF) coupling layer. In this type of medium, as described in U.S. Pat. No. 6,815,082 B2, the first or lower ferromagnetic layer and the second or upper ferromagnetic layer have the same composition and are formed of a conventional polycrystalline granular cobalt alloy. Thus in a perpendicular magnetic recording medium with an AFC RL, the EBL would also have to have an hcp crystalline structure to induce the perpendicular magnetic anisotropy of the lower layer in the AFC layer. This type of medium is depicted schematically in FIG. 3.

The best performance for writing perpendicular magnetic recording is obtained when the EBL is as thin as possible, i.e., the minimum thickness required to provide magnetic decoupling of the SUL and the RL, so that flux can readily pass through the EBL during the write process. However, while a reduction in thickness of the EBL is desirable, the EBL must have a thickness sufficient to provide the template for the growth of the cobalt alloy RL to assure its c-axis is perpendicular. A relatively thick Ru EBL is also required to provide an RL with high coercivity and low enough inter-granular exchange coupling to minimize the intrinsic media noise. Thus, if Ru is used as the EBL it must be at least approximately 80 Angstroms thick for current RL materials.

What is needed is a perpendicular magnetic recording medium with an AFC recording and a substantially thinner effective EBL.

SUMMARY OF THE INVENTION

The invention is a perpendicular magnetic recording medium that has an AFC RL, but wherein the lower ferromagnetic layer (LFM) of the AFC layer has substantially higher magnetic permeability than the magnetic permeability of the upper ferromagnetic layer (UFM). The LFM functions as part of an "effective EBL", thereby allowing the actual EBL to be made as thin as possible. Generally, the LFM can be made to have a higher magnetic permeability by selection of a material composition that will result in increased inter-granular exchange when compared to the UFM and a substantially lower anisotropy field ($K_u/M$) than the anisotropy field of the UFM. Thus the material composition of the LFM can be chosen to provide a lower anisotropy $K_u$ and/or a higher moment M. While the LFM has a relatively high magnetic permeability, it still has sufficient perpendicular magnetic anisotropy to retain a magnetization and thus function as part of the AFC RL. The "effective EBL" is the combined thickness of the actual EBL, the LFM and the AF-coupling layer. The LFM is an hcp material and thus promotes the growth of the hcp UFM in the same way the nonmagnetic EBL does. Thus its thickness can be substituted for the actual EBL thickness to meet the thickness necessary to grow the hcp UFM. This enables the actual EBL to be substantially thinner. The effective EBL appears to be magnetically "thin" during the write process because the relatively high permeability LFM eases the passage of flux to the SUL and the LFM appears thinner than its physical thickness. However, the effective EBL appears magnetically "thick" during the read-back process because the LFM is magnetized antiparallel to the magnetization of the UFM after writing.

For a fuller understanding of the nature and advantages of the present invention, reference should be made to the following detailed description taken together with the accompanying figures.

DETAILED DESCRIPTION OF THE INVENTION

Figure 3:
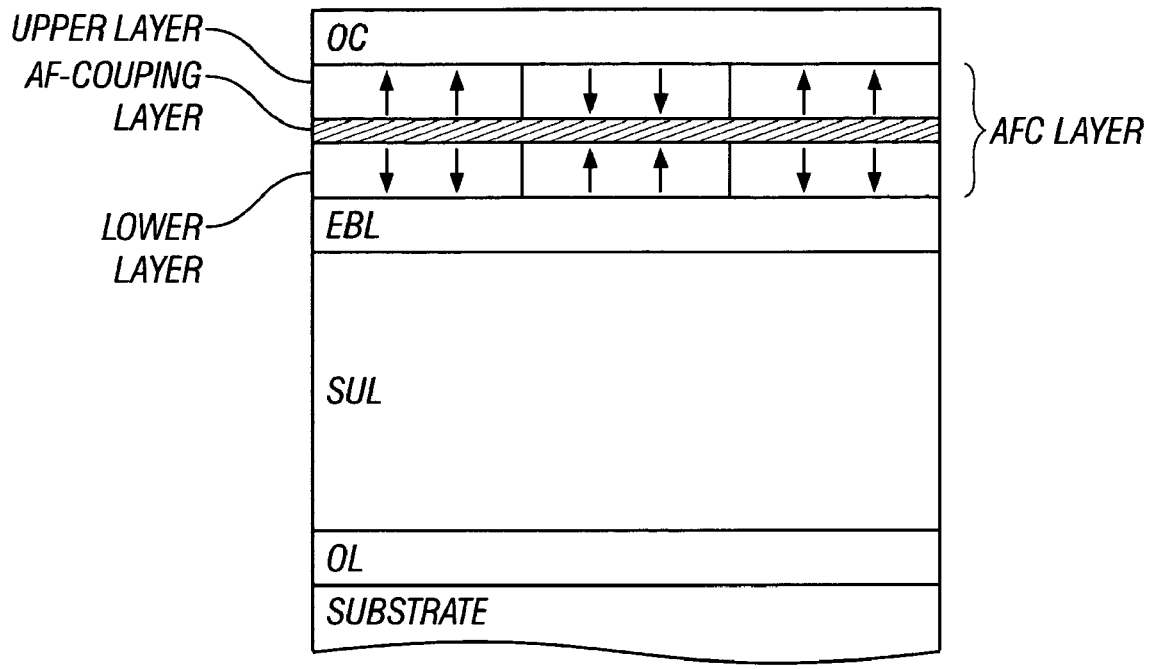
FIG. 3 is a schematic of a cross-section of a perpendicular magnetic recording disk having an antiferromagnetically-coupled (AFC) RL according to the prior art.
Figure 4:
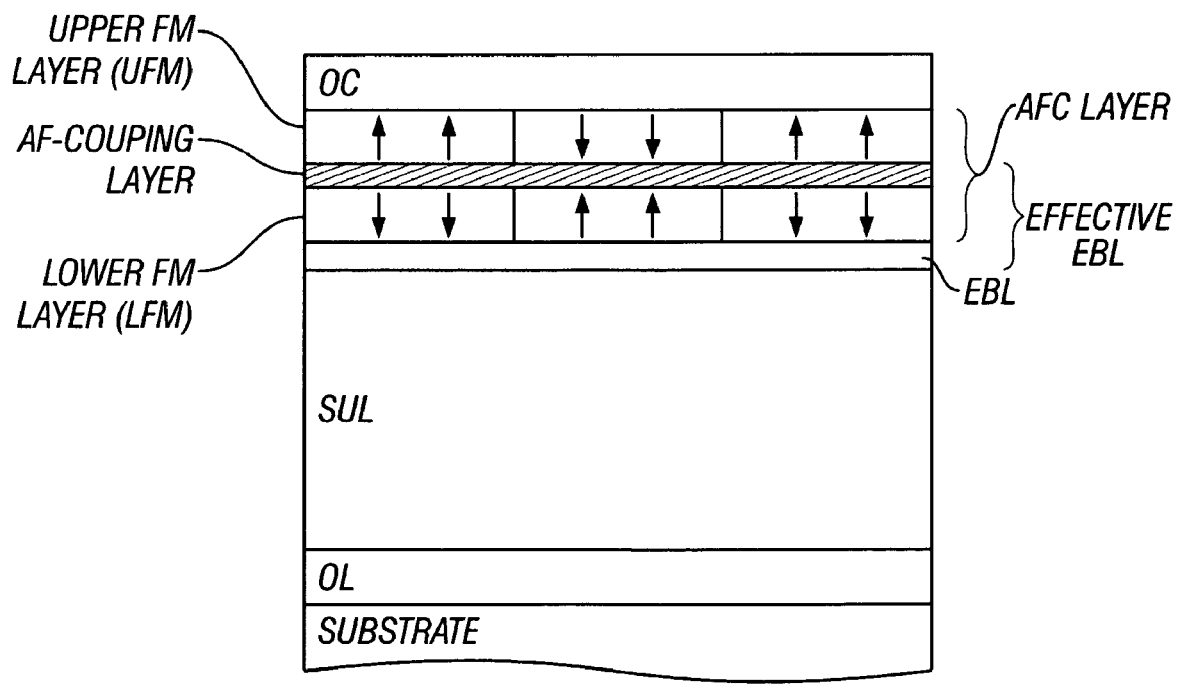
FIG. 4 is a schematic of a cross-section of a perpendicular magnetic recording disk according to the present invention having an AFC RL and an effective exchange break layer (EBL) with a substantially thinner actual EBL than the prior art disk of FIG. 3.

The perpendicular magnetic recording medium according to the present invention is illustrated in FIG. 4. The structure appears similar to the prior art structure of FIG. 3, except that the lower ferromagnetic layer (LFM) of the AFC layer has substantially higher magnetic permeability than the permeability of the upper ferromagnetic layer (UFM). The LFM functions as part of an "effective EBL", thereby allowing the actual EBL to be made as thin as possible. While the LFM has a relatively high magnetic permeability, it still has sufficient perpendicular magnetic anisotropy to retain a magnetization and thus function as part of the AFC layer.

Referring to FIG. 4, the hard disk substrate may be any commercially available glass substrate, but may also be a conventional aluminum alloy with a NiP surface coating, or an alternative substrate, such as silicon, canasite or silicon-carbide. The adhesion layer or OL for the growth of the SUL may be an AlTi alloy or a similar material with a thickness of about 20 to 50 Angstroms. The SUL may be formed of amorphous magnetically permeable materials such as alloys of FeCoB, CoCuFe, NiFe, FeAlSi, FeTaN, FeN, FeTaC, CoTaZr, CoFeB, and CoZrNb with a thickness in the range of approximately 500 to 4000 Angstroms. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr, as described in U.S. Pat. Nos. 6,686,070 B1 and 6,835,475 B2. The OC formed on top of the UFM may be an amorphous "diamond-like" carbon film or other known protective overcoats, such as Si-nitride.

The EBL is located on top of the SUL. It acts to break the magnetic exchange coupling between the magnetically permeable films of the SUL and the LFM and also serves to facilitate epitaxial growth of the LFM. The EBL is preferably a material with a hexagonal-close-packed (hcp) crystalline structure, such as Ru, that promotes the epitaxial growth of the hcp LFM so that the c-axis of the hcp LFM is oriented substantially perpendicular, thereby resulting in perpendicular magnetic anisotropy. Ruthenium (Ru) is a commonly used material for the EBL, but other materials include a metal selected from Ti, Re, and Os, and an alloy containing at least one element selected from Ti, Re, Ru, and Os. If Ru is used as the EBL, it may be formed on a seed layer (SL), such as a 20 to 40 Angstrom thick layer of NiFe, formed on the SUL.

The UFM is a layer of granular cobalt alloy with an hcp crystalline structure that exhibits perpendicular magnetic anisotropy, such as a CoPt or CoPtCr alloy, with or without an oxide, such as oxides of Si, Cr, Nb, Ta, Ti, or B. The UFM has a typical thickness of 100 to 250 Angstroms and has a relatively high magnetic anisotropy and a relatively low magnetic permeability (<2.5). The magnetic permeability of a material is its ability to acquire high magnetization in relatively weak magnetic fields. In magnetic recording the magnetic permeability $\mu$ is generally expressed without units as $$\mu = 1 + 4\pi \frac{dM}{dH}$$

where M is in units emu/cm$^3$ and H is in units of Oe.

The nonmagnetic antiferromagnetically (AF) coupling layer between the UFM and LFM is formed of a material selected from the group consisting of ruthenium (Ru), chromium (Cr), rhodium (Rh), iridium (Ir), copper (Cu), and their alloys. The AF-coupling layer has a thickness sufficient to induce perpendicular antiferromagnetic exchange coupling between the UFM and LFM, typically between about 5 to 12 Angstroms. Thus as depicted by the three recorded or magnetized regions in FIG. 4, the magnetizations of the UFM and LFM in each region are always antiparallel. In addition, it is well-known to include very-thin high-moment ferromagnetic interface films on one or both sides of the AF-coupling layer, as described for example in the previously-cited U.S. Pat. No. 6,815,082 B2 patent.

In the present invention the LFM has a composition different from that of the UFM and thus substantially different magnetic properties. The LFM is a granular cobalt alloy material with an hcp crystalline structure and with properties selected so as to provide the LFM with a substantially higher magnetic permeability than that of the UFM. The LFM may be a CoNiCr alloy, or a Co$_{(100-x)}$Cr$_x$ alloy wherein x is less than about 17 atomic percent, or a (CoFe)$_{(100-x)}$Cr$_x$ alloy wherein x is less than about 17 atomic percent. Besides these materials, other materials suitable for the LFM are CoPt or CoPtCr alloys, with or without oxides, like the materials used in the UFM, but with less atomic percent Pt so as to exhibit lower perpendicular magnetic anisotropy, and which, when grown on thin EBLs tend to have higher intergranular exchange coupling and thus higher permeability than the UFM. The LFM may also be formed of the well-known multilayers that exhibit perpendicular magnetic anisotropy, such as multilayers of alternating films of Co/Pt, Co/Pd or Co/Ni. Generally, the LFM can be made to have a higher magnetic permeability by selection of a material composition that will result in increased intergranular exchange and a substantially lower anisotropy field (K$_u$/M) than the anisotropy field of the UFM. Thus the material composition of the LFM can be chosen to provide a lower anisotropy K$_u$ and/or a higher moment M. However, the LFM still has sufficient perpendicular magnetic anisotropy to retain a magnetization and thus function as part of the AFC layer.

In one example, the UFM may be a CoPtCrSiOx material, typically formed by reactive sputtering in oxygen, with a saturation magnetization (M$_s$) of approximately 400 emu/cm$^3$, and the LFM may be a CoCr alloy with M$_s$ of approximately 600 emu/cm$^3$. Then the LFM would have a permeability of greater than 3 compared to about 1.7 for the UFM. The preferred difference in permeability is that the LFM have a permeability greater than that of the UFM by approximately 1.5 to 10.

In the structure of FIG. 4, the "effective EBL" is the combined thickness of the actual EBL, the LFM and the AF-coupling layer. Because the hcp LFM promotes the growth of the UFM in the same way the nonmagnetic EBL does, its thickness can be substituted for the actual EBL thickness with respect to meeting the current 80 Angstroms thickness requirement. Therefore, the thickness of the actual EBL can now be substantially less than the approximately 80 Angstroms required by the prior art structure. The effective EBL (EBL+LFM+coupling layer) appears to be magnetically "thin" during the write process because the relatively high permeability LFM eases the passage of flux to the SUL and the LFM appears thinner than its physical thickness. However, the effective EBL has a thickness necessary to grow a high-coercivity, low-noise UFM, and it also appears magnetically "thick" during the readback process because the LFM forms an antiparallel configuration to the UFM after writing. The actual EBL can be as thin as approximately 10 Angstroms, in which case the LFM would have a thickness of at least approximately 60 Angstroms and the AF-coupling layer would have a thickness of approximately 10 Angstroms.

Figure 1:
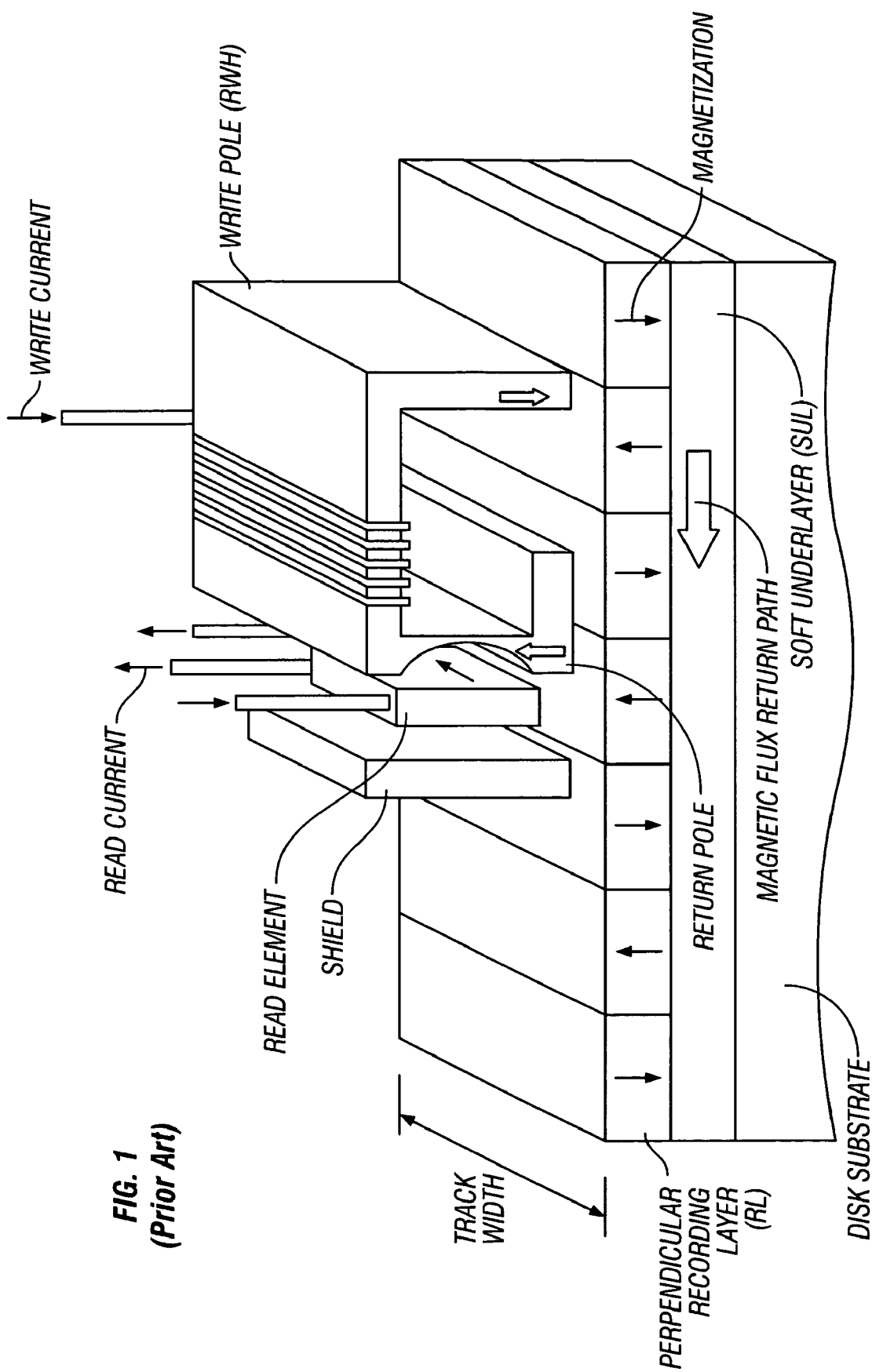
FIG. 1 is a schematic of a prior art perpendicular magnetic recording system.
Figure 2:
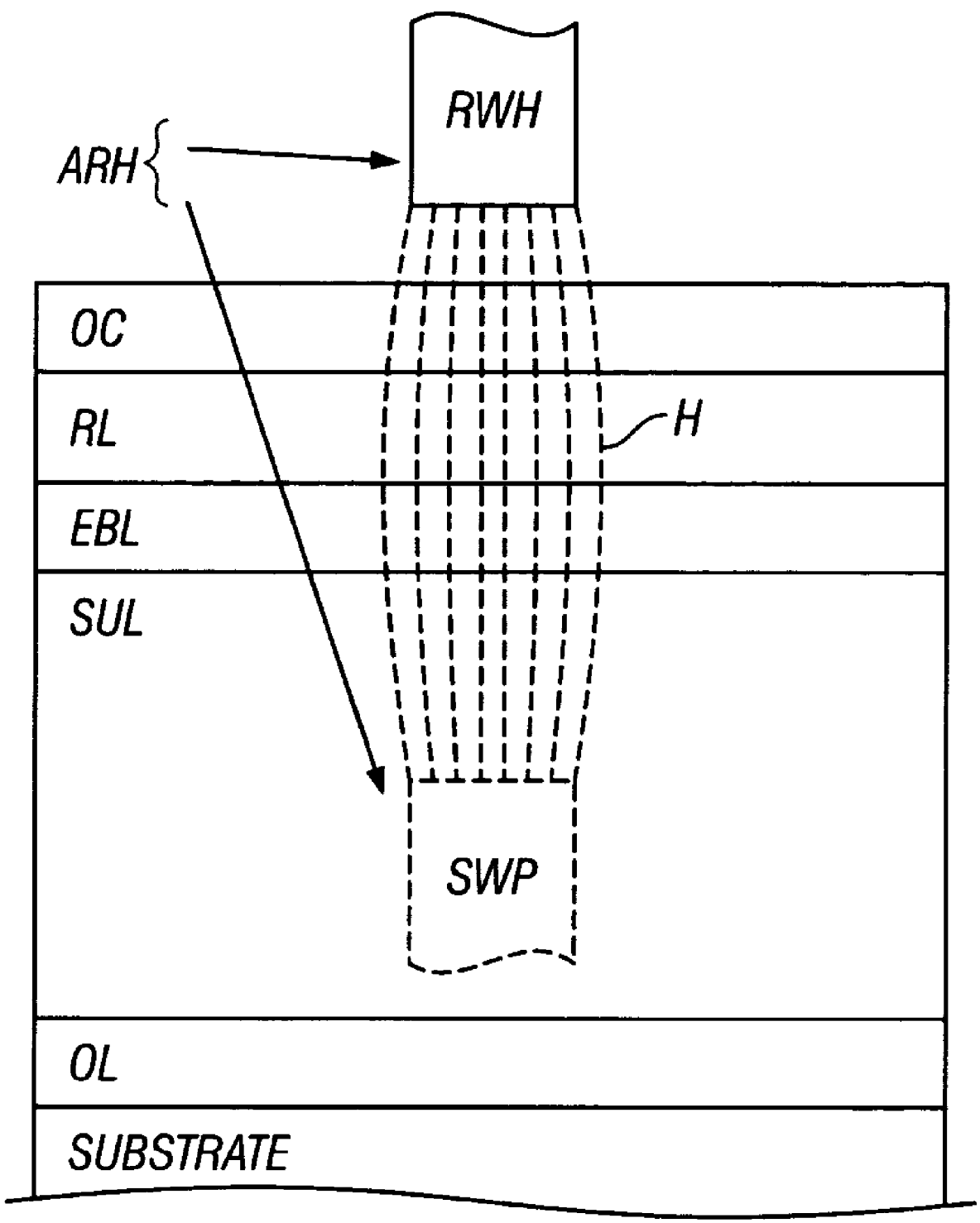
FIG. 2 is a schematic of a cross-section of a prior art perpendicular magnetic recording disk showing the write field H acting on the recording layer (RL).

An additional problem with Type 1 perpendicular magnetic recording systems (FIG. 1) is that the SUL also affects the read-back amplitude of the magnetic transitions as read by the read element or head. In particular, low-frequency transitions have much higher amplitudes. The thinner the SUL the greater is the amplitude increase at low frequency. Therefore, when the EBL is thin the dynamic amplitude range that the read head needs to be sensitive to is quite large. This makes design of the read head and associated read circuitry very challenging. Therefore, although it is beneficial to have a thin EBL for writing it can be problematic for reading. The present invention solves this problem because the effective EBL is thin for writing, yet remains thick for reading. Therefore, with the present invention the advantage of having a thin EBL is obtained for writing without the deleterious effects it would have on reading. Although the previously-cited U.S. Pat. No. 6,815,082 B2 describes an AFC RL it does not enable the use of an EBL that is thin for writing while remaining thick for reading.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
a substrate;
an underlayer of magnetically permeable material on the substrate;
an antiferromagnetically-coupled (AFC) layer comprising first and second ferromagnetic layers separated by a nonmagnetic antiferromagnetically-coupling layer, the second ferromagnetic layer comprising a granular CoPtCr alloy having a hexagonal-close-packed crystalline structure with the c-axis oriented substantially perpendicular to the layer, the first ferromagnetic layer having a hexagonal-close-packed crystalline structure with the c-axis oriented substantially perpendicular to the layer and a composition different from the composition of the CoPtCr alloy of the second ferromagnetic layer so as to provide the first ferromagnetic layer with an anisotropy field lower than the anisotropy field of the second ferromagnetic layer, whereby the first ferromagnetic layer has a magnetic permeability higher than the magnetic permeability of the second ferromagnetic layer by at least 1.5; and
an exchange break layer between the underlayer and the first ferromagnetic layer for magnetically decoupling the underlayer and the first ferromagnetic layer and for inducing the substantially perpendicular c-axis orientation of the first ferromagnetic layer.

2. The medium of claim 1 wherein the first ferromagnetic layer comprises a CoPtCr alloy having less atomic percent Pt than the CoPtCr alloy of the second ferromagnetic layer.

3. The medium of claim 1 wherein the second ferromagnetic layer further comprises an oxide of one or more of Si, Cr, Nb, Ta, Ti and B.

4. The medium of claim 1 wherein the first ferromagnetic layer comprises a cobalt alloy selected from the group consisting of (a) a $Co_{(100-x)}Cr_x$ alloy wherein x is less than about 17 atomic percent, and (b) a $(CoFe)_{(100-x)}Cr_x$ alloy wherein x is less than about 17 atomic percent.

5. The medium of claim 1 wherein the first ferromagnetic layer comprises a multilayer of alternating films of Co and one of Pt, Pd or Ni.

6. The medium of claim 1 wherein the exchange break layer is a material selected from the group consisting of Ru, Ti, Re Os, and an alloy of one or more of Ru, Ti, Re, and Os.

7. The medium of claim 6 wherein the exchange break layer consists essentially of Ru.

8. The medium of claim 1 wherein the exchange break layer has a thickness less than approximately 80 Angstroms.

9. The medium of claim 8 wherein the combined thickness of the exchange break layer, the first ferromagnetic layer and the antiferromagnetically-coupling layer is at least approximately 80 Angstroms.

10. The medium of claim 1 wherein the nonmagnetic antiferromagnetically-coupling layer of the AFC layer is formed of a material selected from the group consisting of ruthenium (Ru), chromium (Cr), rhodium (Rh), iridium (Ir), copper (Cu), and their alloys.

11. The medium of claim 1 wherein the underlayer is formed of a material selected from the group consisting of alloys of CoFe, CoNiFe, NiFe, FeCoB, CoCuFe, FeAlSi, FeTaN, FeN, FeTaC, CoTaZr and CoZrNb.

12. The medium of claim 1 wherein the underlayer is lamination of multiple magnetically permeable films separated by nonmagnetic films.

13. The medium of claim 12 wherein the nonmagnetic films in the lamination provide antiferromagnetic coupling of the magnetically permeable films in the lamination.

14. A perpendicular magnetic recording disk comprising:
a substrate;
an underlayer of magnetically permeable material on the substrate;
an exchange break layer on the underlayer;
an antiferromagnetically-coupled (AFC) layer comprising a lower ferromagnetic layer (LFM) having a hexagonal-close-packed crystalline structure and perpendicular magnetic anisotropy on the exchange break layer, a nonmagnetic antiferromagnetically-coupling layer on the LFM, and a granular CoPtCr alloy upper ferromagnetic layer (UFM) having a hexagonal-close-packed crystalline structure and perpendicular magnetic anisotropy on the antiferromagnetically-coupling layer, the LFM comprising a cobalt alloy having a composition different from the composition of the CoPtCr alloy of the UFM and selected from the group consisting of (a) a CoPtCr alloy having less atomic percent Pt than the CoPtCr alloy of the UFM, (b) a $Co_{(100-x)}Cr_x$ alloy wherein x is less than about 17 atomic percent, and
(c) a $(CoFe)_{(100-x)}Cr_x$ alloy wherein x is less than about 17 atomic percent, the LFM having an anisotropy field lower than the an isotropy field of the UFM and a magnetic permeability higher than the magnetic permeability of the UFM by at least 1.5; and wherein the exchange break layer has a thickness less than approximately 80 Angstroms and the combined thickness of the exchange break layer, the lower ferromagnetic layer and the antiferromagnetically-coupling layer is at least approximately 80 Angstroms.

15. The disk of claim 14 wherein the UFM further comprises an oxide of one or more of Si, Cr, Nb, Ta, Ti and B.

16. The disk of claim 14 wherein the exchange break layer is a material selected from the group consisting of Ru, Ti, Re Os, and an alloy of one or more of Ru, Ti, Re, and Os.

17. The disk of claim 14 wherein the underlayer is formed of a material selected from the group consisting of alloys of CoFe, CoNiFe, NiFe, FeCoB, CoCuFe, FeAlSi, FeTaN, FeN, FeTaC, CoTaZr and CoZrNb.

18. The disk of claim 14 wherein the underlayer is lamination of multiple magnetically permeable films separated by at least one nonmagnetic film, the at least one nonmagnetic film in the lamination providing antiferromagnetic coupling of the magnetically permeable films in the lamination.

19. A perpendicular magnetic recording system comprising:
the disk of claim 14;
a write head for magnetizing regions in the AFC layer of said disk; and
a read head for detecting the transitions between said magnetized regions.

* * * * *